H. D. C. HARRISON.
PIPE COUPLING.
APPLICATION FILED MAY 25, 1908.
906,225.
Patented Dec. 8, 1908.
2 SHEETS—SHEET 1.
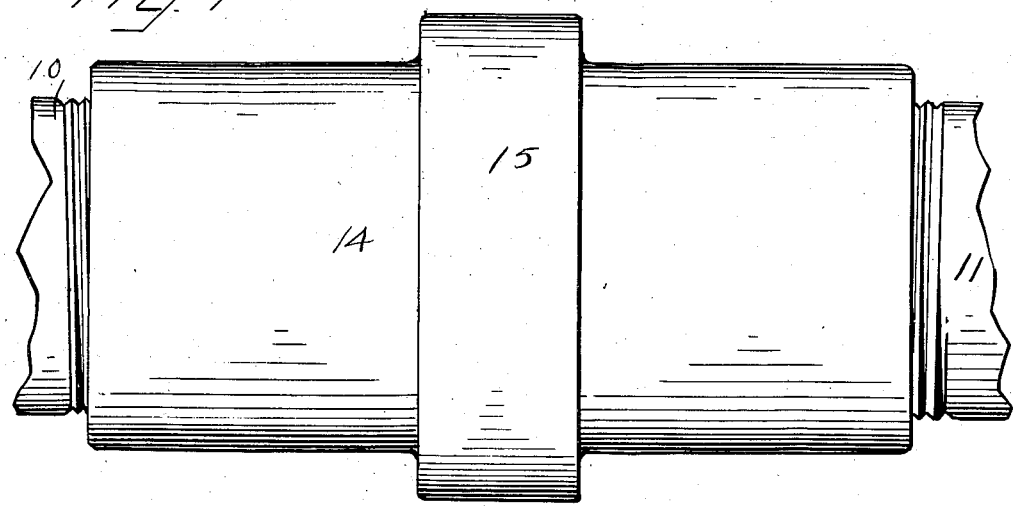
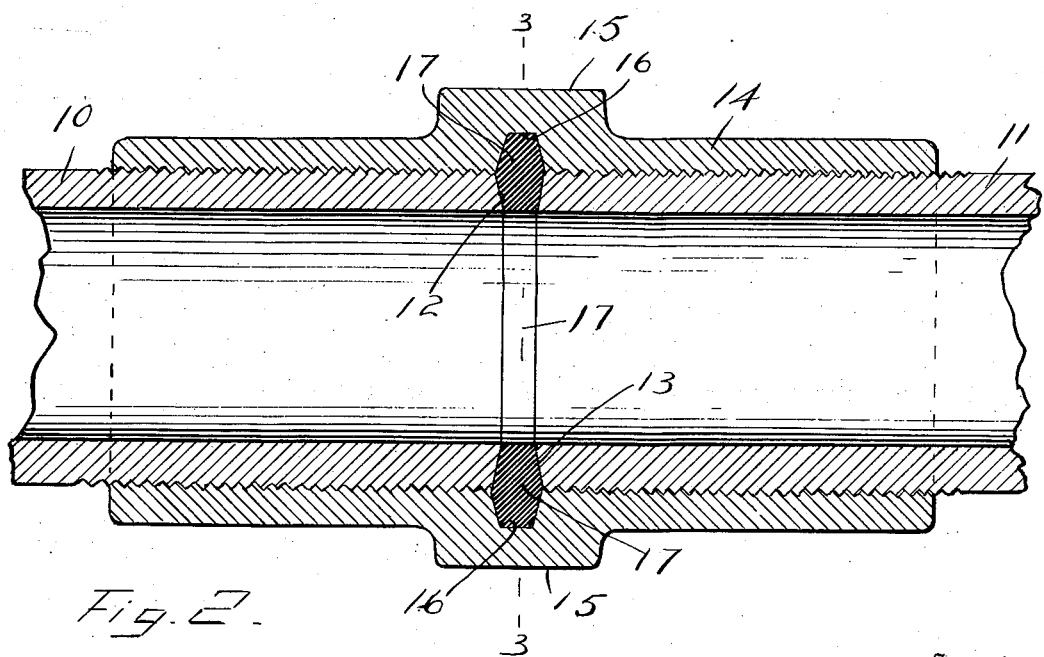
Witnesses
J. C. Simpson.
M. J. Miller
Inventor
Harry D. C. Harrison.
By Chandler & Chandler.
Attorneys

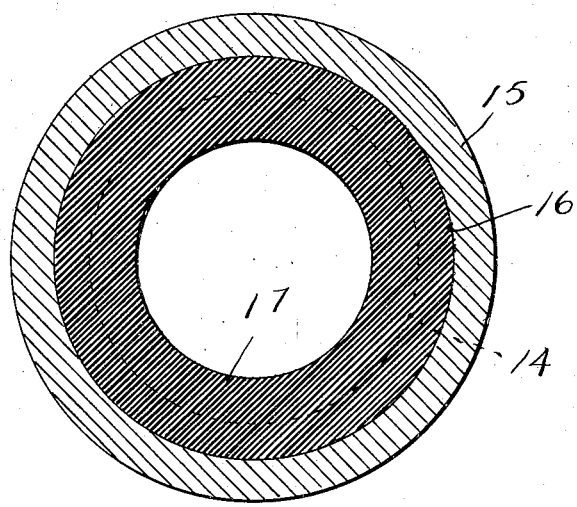
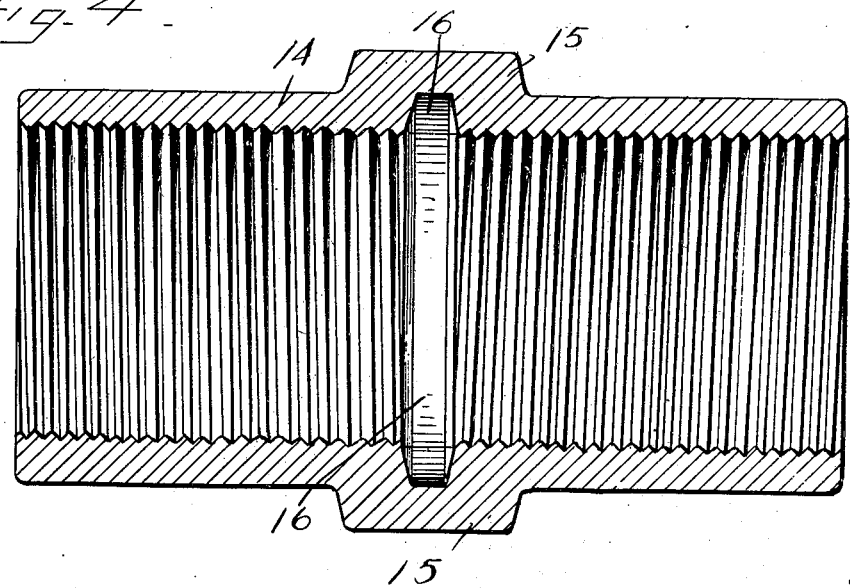

UNITED STATES PATENT OFFICE.

HARRY D. C. HARRISON, OF KINGSVILLE, PENNSYLVANIA.

PIPE-COUPLING.

No. 906,225.  Specification of Letters Patent.  Patented Dec. 8, 1908.

Application filed May 25, 1908. Serial No. 434,934.

*To all whom it may concern:*

Be it known that I, HARRY D. C. HARRISON, a citizen of the United States, residing at Kingsville, in the county of Clarion, State of Pennsylvania, have invented certain new and useful Improvements in Pipe-Couplings; and I do hereby declare the following to be a full, clear, and exact description of the invention, such as will enable others skilled in the art to which it appertains to make and use the same.

This invention relates to the joints or couplings whereby pipe sections are united, and has for one of its objects to improve and simplify devices of this character and increase the efficiency and utility.

Another object of the invention is to provide a device of this character wherein the packing efficiency of the element is increased and the tendency to leakage around the outer portion thereof, prevented.

With these and other objects in view the invention consists in means whereby a packing element is caused to be expanded outwardly into a coupling collar simultaneously with its compression between the confronting ends of the pipe sections, to prevent leakage around the outer portion of the packing element.

With these and other objects in view the invention consists in certain novel features of construction as hereafter shown and described and then specifically pointed out in the claims, and in the drawings illustrating the preferred embodiment of the invention, Figure 1 is a side elevation of the improved coupling. Fig. 2 is a longitudinal sectional view. Fig. 3 is a section on the line 3—3 of Fig. 2. Fig. 4 is a longitudinal sectional view of the collar detached.

Great difficulty is experienced in preventing leakage at the joints in lines of piping, especially of piping employed for conveying gas, oil and the like, and the improved coupling herein shown and described is designed more particularly for piping employed for this purpose, and is arranged to produce a combined compressing and expanding effect upon the packing element, by compressing it between the confronting ends of the pipe sections and expanding it into a coupling collar, whereby a double acting packing element is provided, one packing action between the confronting ends of the pipe sections, and another packing action between the collar and the packing element, so that if any leakage occurs between the packing and the pipe sections, it will be checked by the expansion of the packing in the coupling element.

In the improved device the confronting ends of the pipe sections 10—11 are beveled outwardly as shown at 12—13 and the sections externally threaded to receive an internally threaded collar 14, the latter having an annular enlargement 15, and an annular channel or groove 16 opposite the enlargement, the sides of the channel converging toward the outside. The channel thus forms a seat for an annular packing element 17 of rubber or like compressible material.

The packing element is formed with the sides converging from the center toward the outer and inner edges, the inner converging portion corresponding to and engaging between the beveled confronting ends of the pipe sections, and the outer converging portion conforming to and engaging in the converging channel 16. By this means when the pipe sections are rotated within the collar and moved toward each other by the action of the screw threads, the beveled ends of the pipe sections compress the packing element between them and likewise expand it outwardly, into the channel 16 and the converging walls of the channel cause the packing element to be also expanded inwardly toward its larger central portion. If therefore any leakage occurs between the ends of the pipe sections and the packing element, it will be effectually checked by the two fold expanded and central portion of the packing element.

The improved device will be found especially advantageous for employment in connection with pipe lines for transporting oil, natural gas, and the like for long distances, as the pressure in such lines is very high and requires a very rigid coupling, and one in which the flexible packing may be both compressed and expanded to prevent leakage.

The improvement may be applied to pipes of all sizes and to pipes constructed from any material, and employed for any purpose.

What is claimed, is:—

1. The combination of pipe sections having their confronting ends beveled outwardly and externally threaded, a collar internally threaded and engaging the threaded portions of the pipe sections and provided with an internal annular groove formed with the sides converging toward the outside, and an annular packing member with the sides converging from the center toward the outer and inner edges and engaging in said groove and between the beveled ends of the pipe sections.

2. A packing for pipe couplings formed of an annular body of yieldable material with the sides converging from the center toward the inner and outer edges, a collar having an annular channel centrally thereof and with the sides diverging toward the interior of the collar, said collar internally threaded between the channel and the ends and engaging over the confronting ends of two externally threaded pipe sections with the converging outer portion of the packing element engaging the channel and the inner converging portion of the element engaging between the confronting ends of the pipe sections.

In testimony whereof, I affix my signature, in presence of two witnesses.

HARRY D. C. HARRISON.

Witnesses:
ALVIN J. CYPHERT,
DANIEL E. CYPHERT.